(12) United States Patent
Lu

(10) Patent No.: US 11,487,818 B2
(45) Date of Patent: Nov. 1, 2022

(54) METHOD, APPARATUS, DEVICE AND STORAGE MEDIUM FOR DETERMINING A CENTRAL VERTEX IN A SOCIAL NETWORK

(71) Applicant: Suzhou Dajiaying Information Technology Co., Ltd., Jiangsu (CN)

(72) Inventor: Yuheng Lu, Jiangsu (CN)

(73) Assignee: SUZHOU DAJIAYING INFORMATION TECHNOLOGY CO., LTD, Jiangsu (CN)

( * ) Notice: Subject to any disclaimer, the term of this patent is extended or adjusted under 35 U.S.C. 154(b) by 271 days.

(21) Appl. No.: 16/615,324

(22) PCT Filed: Nov. 6, 2018

(86) PCT No.: PCT/CN2018/114106
§ 371 (c)(1),
(2) Date: Nov. 20, 2019

(87) PCT Pub. No.: WO2020/062450
PCT Pub. Date: Apr. 2, 2020

(65) Prior Publication Data
US 2021/0334311 A1 Oct. 28, 2021

(30) Foreign Application Priority Data
Sep. 28, 2018 (CN) .......................... 201811137653.9

(51) Int. Cl.
*G06F 16/901* (2019.01)
*G06F 16/906* (2019.01)
*G06Q 50/00* (2012.01)

(52) U.S. Cl.
CPC ........ *G06F 16/9024* (2019.01); *G06F 16/906* (2019.01); *G06Q 50/01* (2013.01)

(58) Field of Classification Search
CPC .... G06F 16/9024; G06F 16/906; G06Q 50/01
See application file for complete search history.

(56) References Cited

U.S. PATENT DOCUMENTS

| 2010/0106752 | A1* | 4/2010 | Eckardt, III | .......... G06F 16/338 707/805 |
| 2012/0124099 | A1* | 5/2012 | Stewart | .................. G16H 10/20 707/802 |

(Continued)

FOREIGN PATENT DOCUMENTS

| CN | 102202012 | 9/2011 |
| CN | 105144227 | 12/2015 |

(Continued)

OTHER PUBLICATIONS

Shah (Rumors in a Network, Who's the Culprit?, Shah and Zaman, Nov. 3, 2010) (Year: 2010).*

(Continued)

*Primary Examiner* — Apu M Mofiz
*Assistant Examiner* — Farhad Agharahimi
(74) *Attorney, Agent, or Firm* — Workman Nydegger

(57) ABSTRACT

Provided is a method, apparatus, device and storage medium for determining a center vertex in a social network. The method includes steps described below. Multiple first vertices with a target attribute in the social network are determined; multiple sub-social sets are determined, where each sub-social set comprises one first vertex; a connected branch set corresponding to the each sub-social set is determined, where the connected branch set corresponding to the each sub-social set is a set of connected branches in a graph formed by vertices associated with the each sub-social set and lacking the target attribute; centrality of the first vertex comprised in the each sub-social set is obtained according to the each sub-social set and the connected branch set corresponding to the each sub-social set; and a first vertex with (Continued)

centrality satisfying a preset centrality requirement from the multiple first vertices is selected as the center vertex.

10 Claims, 4 Drawing Sheets

(56) References Cited

U.S. PATENT DOCUMENTS

2014/0280224 A1* 9/2014 Feinberg ............ G06F 16/9024
  707/748
2016/0125093 A1   5/2016 Cho et al.

FOREIGN PATENT DOCUMENTS

| | | |
|---|---|---|
| CN | 105723402 | 6/2016 |
| CN | 105975532 | 9/2016 |
| CN | 108009933 | 5/2018 |
| CN | 108122168 | 6/2018 |

OTHER PUBLICATIONS

International Search Report issued in PCT/CN2018/114106 dated May 29, 2019.

* cited by examiner

METHOD, APPARATUS, DEVICE AND STORAGE MEDIUM FOR DETERMINING A CENTRAL VERTEX IN A SOCIAL NETWORK

CROSS-REFERENCE TO RELATED APPLICATIONS

This is a National Stage Application, filed under 35 U.S.C. 371, of International Patent Application No. PCT/CN2018/114106, filed on Nov. 6, 2018, which claims priority to and the benefit of Chinese patent application No. 201811137653.9 filed on Sep. 28, 2018, the contents of which are incorporated herein by reference in their entirety.

TECHNICAL FIELD

The present disclosure relates to a technical field of graph theory and, for example, to a method, apparatus, device and storage medium for determining a center vertex in a social network.

BACKGROUND

Compared with traditional forums and blogs, a social network is a bridge between virtual world and real world, which establishes on the Internet a relationship among people from real life. When a computer is used to process the social network, the whole social network is normally regarded as a structure of a graph. Everyone is a vertex in the graph, and a relationship between two persons is an edge between vertices.

A central vertex has higher centrality in the social network, that is, it has certain influence and importance in the social network. Indicators for measuring the centrality include degree centrality, closeness centrality, eigenvector centrality and so on. However, the method for determining a center vertex in related art does not consider mutual influence among vertices with different attributes, which results in inaccuracy in determination of the center vertex.

SUMMARY

The present disclosure provides a method, apparatus, device and storage medium for determining a center vertex in a social network, which can increase accuracy in determination of the center vertex.

The present disclosure provides a method for determining a center vertex in a social network. The method includes steps descried below.

Multiple first vertices with a target attribute in the social network are determined;

multiple sub-social sets are determined, where each sub-social set includes one first vertex among the first vertices;

a connected branch set corresponding to the each sub-social set is determined, where the connected branch set corresponding to the each sub-social set is a set of connected branches in a graph formed by vertices associated with the each sub-social set and lacking the target attribute;

centrality of the first vertex included in the each sub-social set is obtained according to the each sub-social set and the connected branch set corresponding to the each sub-social set; and a first vertex with centrality satisfying a preset centrality requirement from the multiple first vertices is selected as the center vertex.

The present disclosure further provides an apparatus for determining a center vertex in a social network. The apparatus includes a first determination module, a second determination module, a third determination module, a processing module and a selection module.

The first determination module is configured to determine multiple first vertices with a target attribute in the social network.

The second determination module is configured to determine multiple sub-social sets, where each sub-social set includes respective one first vertex among the multiple first vertices.

The third determination module is configured to determine a connected branch set corresponding to the each sub-social set, where the connected branch set corresponding to the each sub-social set is a set of connected branches in a graph formed by vertices associated with the each sub-social set and lacking the target attribute.

The processing module is configured to obtain centrality of the first vertex included in the each sub-social set according to the each sub-social set and the connected branch set corresponding to the each sub-social set.

The selection module is configured to select a first vertex with centrality satisfying a preset centrality requirement from the multiple first vertices as the center vertex.

The present disclosure further provides an electronic device, which includes at least one processor and a memory. The memory is configured to store at least one program. The at least one program, when executed by the at least one processor, implements the method for determining a center vertex in a social network.

The disclosure further provides a computer readable storage medium, storing a computer program. The computer program, when executed by a processor, implements the method for determining a center vertex in a social network.

The method for determining a center vertex provided by the present disclosure fully considers not only influence of internal and external sets on the centrality of the first vertex, but also mutual influence among vertices with different attributes, so as to achieve higher accuracy in determination of the center vertex.

DETAILED DESCRIPTION

The present disclosure will be described below with reference to the drawings and embodiments. The embodiments described herein are for a purpose of explaining the present disclosure only and are not intended to limit the present disclosure. In addition, for convenience of description, only some but not all structures related to the present disclosure are shown in the drawings.

Embodiment One

Figure 1:
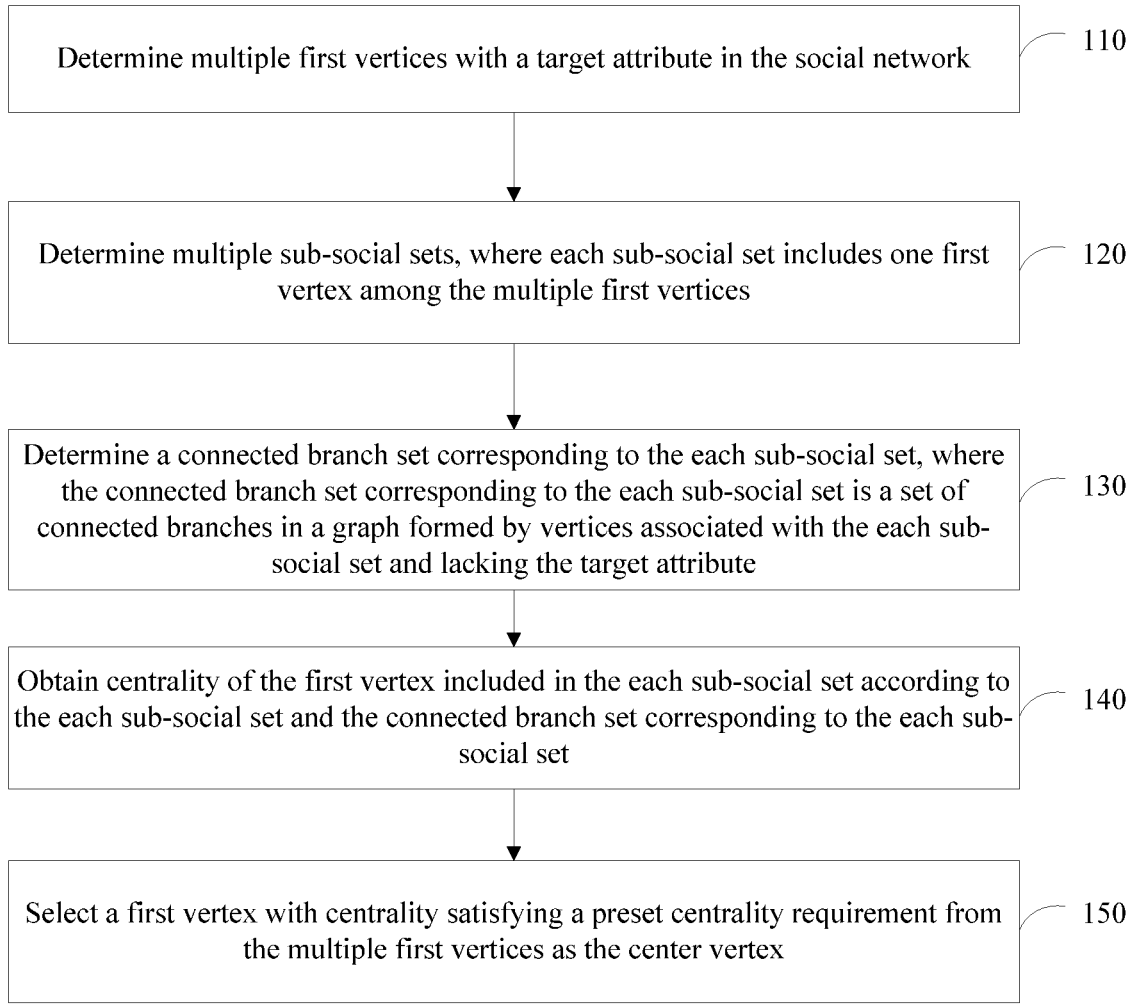
FIG. 1 is a flowchart of a method for determining a center vertex in a social network according to an embodiment.

FIG. 1 is a flowchart of a method for determining a center vertex in a social network according to an embodiment. This embodiment may be applied to a case of determination of a center vertex in a social network. In full consideration of influence of different sets on centrality of a vertex, this embodiment provides a new method for determining the center vertex in the social network. The method according to this embodiment may be performed by an apparatus for determining a center vertex in a social network. This apparatus may be composed of hardware and/or software and is generally integrated in an electronic device. Referring to FIG. 1, the method according to this embodiment includes steps as described.

In step 110, multiple first vertices with a target attribute in the social network are determined.

The social network in this embodiment refers to a relationship network formed among people based on social activities. When a computer is used to process a social network, this whole social network is regarded as a structure of a graph. Each person is a vertex in the graph, and a relationship between two persons is an edge between vertices. For example, a relationship between two person includes storing one in an address book of the other, talking to each other, or having business contact.

In this embodiment, the social network includes multiple vertices with the target attribute and at least one vertex without the target attribute. In an embodiment, an attribute of a vertex is an attribute of a user corresponding to the vertex. A vertex with the target attribute is an interested vertex in the social network. For example, the target attribute is an authenticated user, a user A is an authenticated user, a vertex corresponding to the user A has an authenticated user attribute.

In addition to the multiple vertices with the target attribute, the social network further includes at least one vertex without the target attribute. In an embodiment, the vertex without the target attribute may have an attribute other than the target attribute or have no attribute. For example, a user B is a registered user instead of an authenticated user, a vertex corresponding to the user B has registered user attribute, that is, the vertex does not have the authenticated user attribute. In another example, a user C has no attribute, a vertex corresponding to user C is considered as a vertex without the authenticated user attribute.

In this embodiment, all vertices with the target attribute in the social network are determined as first vertices first, and steps 120 to 140 are performed on each of the first vertices to calculate centrality of each first vertex. In an embodiment, steps 120 and 140 may be performed on the first vertices in series or in parallel.

In step 120, multiple sub-social sets are determined, where each sub-social set includes one first vertex among the multiple first vertices.

In an embodiment, a sub-social set includes a first vertex and other vertices. In an embodiment, each of other vertices is a vertex associated with the first vertex and has the target attribute. In an embodiment, for each first vertex, at least one second vertex associated with the each first vertex and having the target attribute is determined, and the at least one second vertex and the first vertex corresponding to the at least one second vertex form a sub-social set.

In order to facilitate description and avoid ambiguity, a j-th first vertex of the multiple first vertices is taken as an example to illustrate a method for forming a sub-social set including the j-th first vertex. Those skilled in the art may obtain the method for forming a sub-social set including other vertices of the multiple first vertices according to this, which will not be repeated here.

In an embodiment, multiple second vertex sets are determined. Each second vertex set corresponds to one first vertex. The second vertices in the each second vertex set are associated with the first vertex corresponding to the each second vertex set and have the target attribute. The each second vertex set and the first vertex corresponding to the each second vertex set form a sub-social set. For each first vertex, a vertex associated with the each first vertex is determined first. After the vertex associated with the each first vertex is determined, a vertex with the target attribute among associated vertices is determined as a second vertex. There is at least one second vertex. For convenience of description and distinction, the whole of the at least one second vertex is called a second vertex set. Next, the second vertex set and the first vertex form a sub-social set.

In an embodiment, a vertex associated with a first vertex may be directly connected to the first vertex. In an embodiment, a vertex directly connected to the first vertex is also called an adjacent vertex of the first vertex and is represented by adj(•). The vertex directly connected to the first vertex has a closest relationship with the first vertex, so that the sub-social set formed in this way almost matches with social groups in real life.

In step 130, a connected branch set corresponding to the each sub-social set is determined, where the connected branch set corresponding to the each sub-social set is a set of connected branches in a graph formed by vertices associated with the each sub-social set and lacking the target attribute.

In order to facilitate description and avoid ambiguity, the j-th first vertex of the multiple first vertices is also taken as an example to explain a method for determining a connected branch set corresponding to the j-th first vertex.

In an embodiment, vertices associated with any vertex in a sub-social set corresponding to the j-th first vertex are determined first, and one or more vertices without the target attribute are determined among the vertices associated with the any vertex. A graph formed by the vertices without the target attribute includes at least one connected branch, and the whole of the at least one connected branch is called a set of connected branches.

In an embodiment, vertices associated with any vertex in the sub-social set may be the vertices directly connected to the any vertex in the sub-social set. Related description of the directly connected vertices is detailed as above-mentioned and will not be described here again.

In step 140, centrality of the first vertex included in the each sub-social set is obtained according to the each sub-social set and the connected branch set corresponding to the each sub-social set.

In this embodiment, the centrality of a first vertex is calculated by combing two factors: a sub-social set and a connected branch set corresponding to the sub-social set. In an embodiment, the centrality of each first vertex is obtained by combining an centrality indicator of the each sub-social set and a corresponding centrality indicator of the connected branch set corresponding to the each sub-social set. For example, the weighted sum or the product of the centrality indicator of the each sub-social set and the corresponding centrality indicator of the connected branch set corresponding to the each sub-social set is calculated. In an embodiment, the centrality indicator includes, but not limited to, degree centrality, proximity centrality, eigenvector centrality, and so on.

In step 150, a first vertex with centrality satisfying a preset centrality requirement from the multiple first vertices is selected as the center vertex.

Researchers may autonomously set a preset centrality requirement. In an embodiment, among the multiple first vertices, a first vertex with maximum centrality is selected as the center vertex. In an embodiment, among the multiple first vertices, a first vertex with centrality greater than or equal to a centrality threshold is selected as the center vertex. If there is more than one first vertex with centrality greater than or equal to the centrality threshold, one of these first vertices is arbitrarily selected as the center vertex, or a first vertex with maximum centrality is selected from these first vertices as the center vertex.

In an embodiment, the centrality threshold may be set according to a degree of importance of vertices in the social network. The greater a centrality threshold is, the higher a degree of importance of the selected center vertex in the social network is.

In this embodiment, the multiple first vertices with the target attribute in the social network are determined, and the multiple sub-social sets are determined, where each sub-social set includes a corresponding first vertex and a connected branch set corresponding to the each sub-social set, and the connected branch set corresponding to the each sub-social set is a set of connected branches in a graph formed by vertices associated with the each sub-social set and lacking the target attribute; centrality of the first vertex included in the each sub-social set is obtained according to the each sub-social set and the connected branch set corresponding to the each sub-social set, so that the centrality of the each first vertex is obtained according to internal and external sets, and a first vertex with centrality satisfying the preset centrality requirement is selected as the central vertex, so that influence of the internal and external sets on the centrality of the first vertex is fully taken into consideration, and mutual influence among vertices with different attributes is also fully considered, so as to achieve more accuracy in determination of the central vertex.

Embodiment Two

Figure 2:
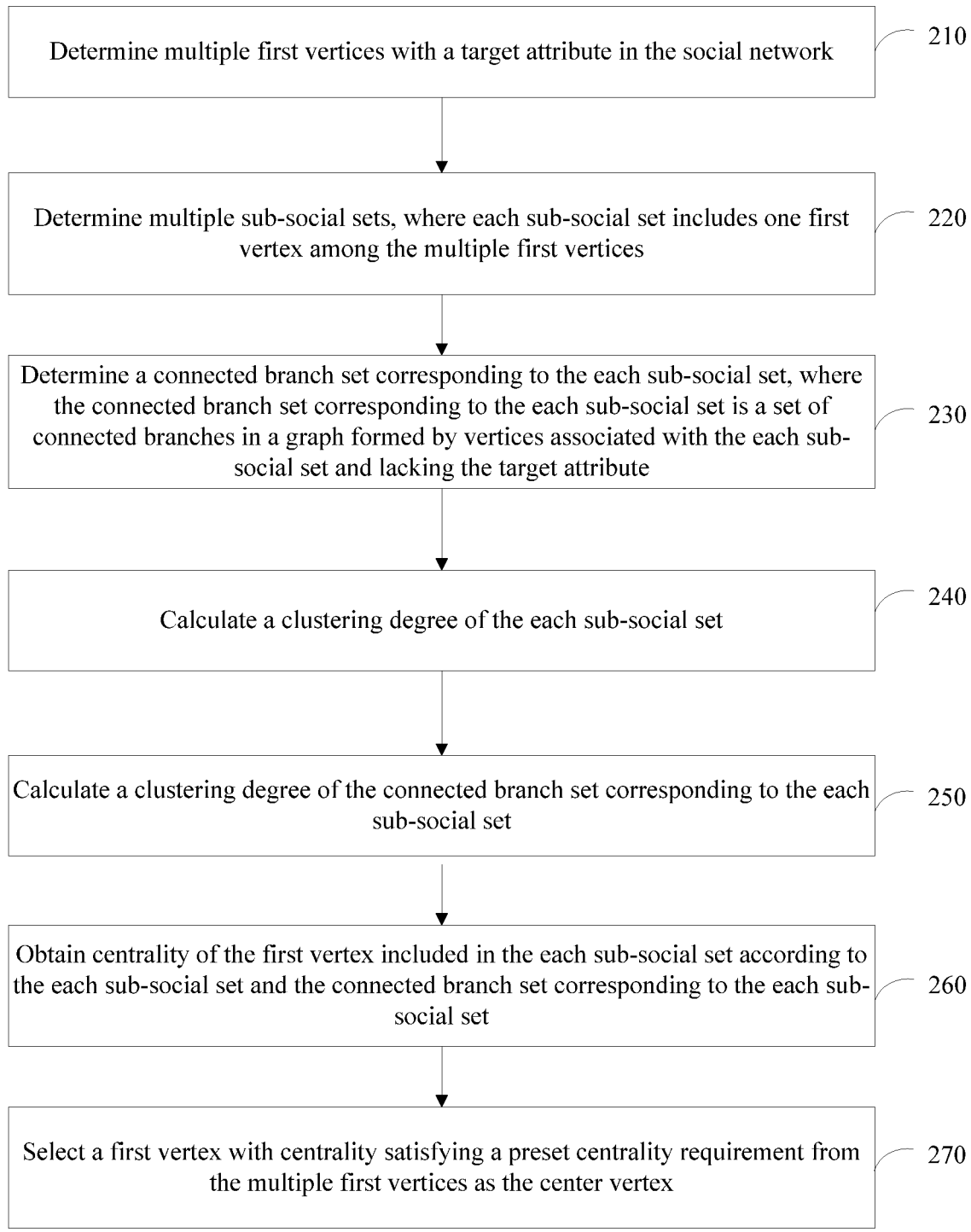
FIG. 2 is a flowchart of a method for determining a center vertex in a social network according to another embodiment.

FIG. 2 is a flowchart of a method for determining a center vertex in a social network according to an embodiment. As shown in FIG. 2, the method according to this embodiment includes steps described below.

In step 210, in the social network, multiple first vertices with a target attribute are determined.

In step 220, multiple sub-social sets are determined, where each sub-social set includes one first vertex among the multiple first vertices.

In step 230, a connected branch set corresponding to the each sub-social set is determined, where the connected branch set corresponding to the each sub-social set is a set of connected branches in a graph formed by vertices associated with the each sub-social set and lacking the target attribute.

In step 240, a clustering degree of the each sub-social set is calculated.

The clustering degree of the each sub-social set refers to a clustering degree of vertices in the each sub-social set. In an embodiment, a degree of the first vertex (i.e., the number of edges connected to the first vertex) may be used as the clustering degree of the sub-social set; or an average path length between the first vertex and the second vertices in the sub-social set may be used as the clustering degree of the sub-social set; or a clustering coefficient may be used to calculate a clustering coefficient of the sub-social set and this clustering coefficient is taken as the clustering degree.

In an embodiment, in graph theory, clustering coefficient is a metric of the tendency of vertices in the graph to gather together. A clustering coefficient includes a vertex clustering coefficient and a network clustering coefficient. The vertex clustering coefficient is used to calculate a clustering degree of a vertex in the network, while the network clustering coefficient is used to calculate a clustering degree of the entire network. In this embodiment, the clustering coefficient of the sub-social set refers to the clustering coefficient of the first vertex in the sub-social set. In this embodiment, the clustering degree of the sub-social set is calculated using the vertex clustering coefficient.

In an embodiment, a clustering coefficient of a sub-social set $M_j$ including a j-th first vertex is calculated according to a vertex clustering coefficient formula:

$$f(M_j) = \frac{2}{\|M_j\| * (\|M_j\| - 1)} \sum_{i,j<=\|M_j\|, i \neq j}^{\|M_j\|} V_{ij}.$$

In the formula, i, j represents an index of vertex, j represents an index of first vertex, i represents an index of second vertex, $\|M_j\|$ represents the number of vertices in a sub-social set $M_j$, $V_{ij}$ represents an edge between a j-th first vertex and an i-th second vertex in the sub-social set $M_j$. If there is an edge between the j-th first vertex and the i-th second vertex, $V_{ij}$ is equal to 1; if there is no edge between the j-th first vertex and the i-th second vertex, $V_{ij}$ is equal to 0. Based on that, $\Sigma_{i,j<=\|M_j\|, i \neq j}^{\|M_j\|} V_{ij}$ represents a sum of numbers of edges between the j-th first vertex and $\|M_j\|-1$ second vertices in the sub-social set $M_j$.

In step 250, a clustering degree of the connected branch set corresponding to the each sub-social set is calculated.

The clustering degree of the connected branch set is obtained according to clustering degrees of multiple connected branches in the connected branch set. For example, the clustering degrees of multiple connected branches are added, multiplied or averaged to obtain the clustering degree of the connected branch set. In an embodiment, the degrees of multiple vertices in a connected branch may be summed up to obtain a clustering degree of the connected branch, or an average path length of the multiple vertices in the connected branch may be taken as the clustering degree of the connected branch.

In step 260, centrality of the first vertex included in the each sub-social set is obtained according to the clustering degree of the each sub-social set and the clustering degree of the connected branch set corresponding to the each sub-social set.

A clustering degree of a sub-social set may be called as an internal clustering degree of a first vertex, and a clustering degree of a connected branch set may be called as an external clustering degree of the first vertex. A larger internal clustering degree means that there are a large number of vertices without the target attribute and distributed around the first vertex. On one hand, in the graph theory, these vertices without the target attribute may also increase the clustering degree of the first vertex. On the other hand, in practical applications, these vertices without the target attribute make the first vertex more valuable for application. For example, the first vertex corresponds to a person with the authentication attribute, and multiple persons without the authentication attribute are distributed around the first vertex. If the first vertex is selected as the center vertex, the promotion of advertisement to the center vertex and the sub-social set may take maximum advantage of advertising effect of the first vertex and network effect corresponding to the sub-social set, promote the conversion from a person without the authentication attribute into a person with the authentication attribute, so that scale of the sub-social set may be expanded.

In an embodiment, weighted summation or multiplexing is performed on the clustering degree of the sub-social set and the clustering degree of the connected branch set corresponding to the each sub-social set, so as to obtain the centrality of the first vertex included in the each sub-social set.

In an embodiment, weighted summation may also be performed on the clustering degree of the each sub-social set and the clustering degree of the connected branch set corresponding to the each sub-social set to obtain the centrality of the first vertex included in the each sub-social set. In an embodiment, a weight for the clustering degree of a sub-social set and a weight for the clustering degree of a connected branch set may be set according to actual application scenarios. In an example, in an application scenario where the clustering degree within a social group is more valued, the weight of the clustering degree of the sub-social set is set to be greater than the weight of the clustering degree of the connected branch set. In another example, in another application scenario where an interaction between vertices with different attributes is more valued, the weight of the clustering degree of the connected branch set is set to be greater than that of the each sub-social set.

In step 270, the first vertex with centrality satisfying a preset centrality requirement from the multiple first vertices is selected as the center vertex.

In this embodiment, the clustering degree of the each sub-social set is calculated to obtain an internal clustering degree of the first vertex in the sub-social set; the clustering degree of the each connected branch set is calculated to obtain an external clustering degree of the first vertex in the social network; the centrality of the first vertex included in the each sub-social set is obtained according to the clustering degree of the each sub-social set and the clustering degree of the connected branch set corresponding to the each sub-social set, so as to obtain the centrality of the first vertex according to the internal clustering degree and the external clustering degree, and select the first vertex with the centrality satisfying the preset centrality requirement as the central vertex, so that mutual influence among vertices with different attributes is fully considered, and more accuracy is achieved in determination of the central vertex.

Embodiment Three

Figure 3A:
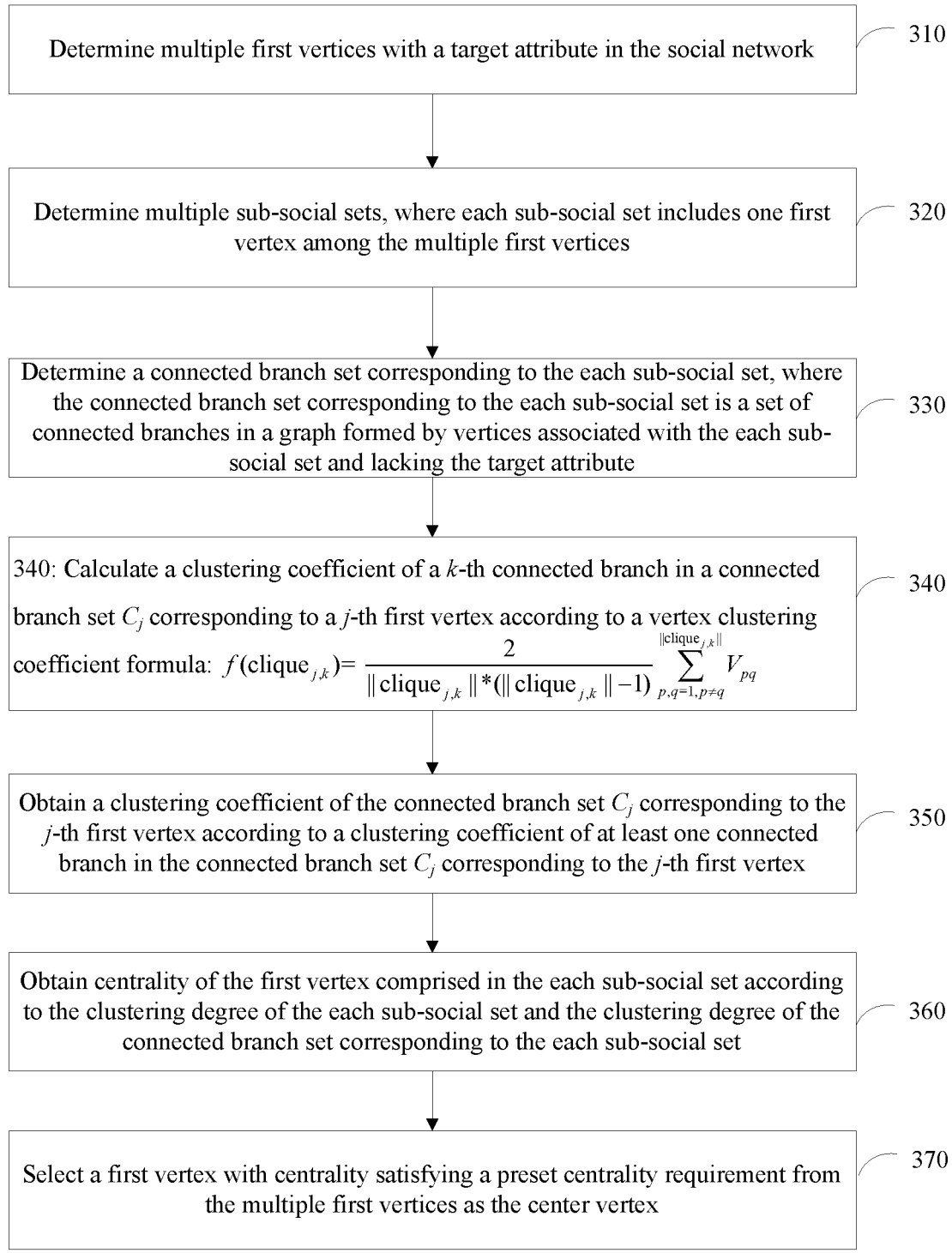
FIG. 3a is a flowchart of a method for determining a center vertex in a social network according to another embodiment.

FIG. 3a is a flowchart of a method for determining a center vertex in a social network according to an embodiment. In this embodiment which implements further optimization on the basis of above embodiments, the clustering coefficient of each connected branch in each connected branch set is calculated using the vertex clustering coefficient, and then the clustering coefficient of the each connected branch set is obtained as the clustering degree of the each connected branch set according to the clustering coefficient of multiple connected branches. Referring to FIG. 3a, the method according to this embodiment includes steps described below.

In step 310, in the social network, multiple first vertices with a target attribute are determined.

In step 320, multiple sub-social sets are determined, where each sub-social set includes one first vertex among the multiple first vertices.

In an embodiment, a method for forming the each sub-social set and calculating the clustering degree is shown in above embodiments, which will not be described here.

In step 330, a connected branch set corresponding to the each sub-social set is determined, where the connected branch set corresponding to the each sub-social set is a set of connected branches in a graph formed by vertices associated with the each sub-social set and lacking the target attribute.

In step 340, a clustering coefficient of a k-th connected branch in a connected branch set $C_j$ corresponding to a j-th first vertex is calculated according to a vertex clustering coefficient formula:

$$f(\text{clique}_{j,k}) = \frac{2}{\|\text{clique}_{j,k}\| * (\|\text{clique}_{j,k}\| - 1)} \sum_{p,q=1, p \neq q}^{\|\text{clique}_{j,k}\|} V_{pq}.$$

The j represents an index of first vertex, $\text{clique}_{j,k}$ represents the k-th connected branch in the connected branch set corresponding to the j-th first vertex, $\|\text{clique}_{j,k}\|$ represents a number of vertices in a connected branch $\text{clique}_{j,k}$, $V_{pq}$ represents an edge between a p-th vertex and a q-th vertex in the connected branch $\text{clique}_{j,k}$. If there is an edge between the p-th vertex and the q-th vertex, $V_{pq}$ is equal to 1; if there is no edge between the p-th vertex and the q-th vertex, $V_{pq}$ is equal to 0. Based on that, $\sum_{p,q=1, p \neq q}^{\|\text{clique}_{j,k}\|} V_{pq}$ represents a sum of numbers of edges among multiple vertices in the connected branch $\text{clique}_{j,k}$.

In step 350, a clustering coefficient of the connected branch set $C_j$ corresponding to the j-th first vertex is obtained according to a clustering coefficient of at least one connected branch in the connected branch set $C_j$ corresponding to the j-th first vertex.

In an embodiment, weighted average of the clustering coefficient of the at least one connected branch in the connected branch set $C_j$ corresponding to the j-th first vertex is calculated using $$\sum_{k=1}^{\|C_j\|} \frac{\|\text{clique}_{j,k}\|}{\|C_j\|} * f(\text{clique}_{j,k})$$

to obtain the clustering coefficient of the connected branch set $C_j$ corresponding to the j-th first vertex; where $\|C_j\|$ represents a number of connected branches in the connected branch set $C_j$.

In the step 350, $\|\text{clique}_{j,k}\|$ represents a weight of a k-th connected branch, that is, a number of vertices in a connected branch is taken as a weight of the corresponding connected branch, a size of connected branches is fully considered, the clustering degree of the connected branch set is calculated, so that calculation accuracy of the clustering degree of the connected branch set is increased.

In step 360, centrality of the first vertex comprised in the each sub-social set is obtained according to the clustering degree of the each sub-social set and the clustering degree of the connected branch set corresponding to the each sub-social set.

In an embodiment, the clustering coefficient of the each sub-social set is multiplied by the clustering coefficient of the connected branch set corresponding to the each sub-social set to obtain the centrality of the first vertex included in the each sub-social set. In an embodiment, the centrality of the first vertex is $$\frac{2}{\|M_j\|*(\|M_j\|-1)} \sum_{i,j<=\|M_j\|, i \neq j}^{\|M_j\|} V_{ij} * \sum_{k=1}^{\|C_j\|} \frac{\|\text{clique}_{j,k}\|}{\|C_j\|} * f(\text{clique}_{j,k}).$$

In step 370, a first vertex with centrality satisfying a preset centrality requirement from the multiple first vertices is selected as the center vertex.

In this embodiment, a clustering coefficient of a connected branch is calculated by the vertex clustering coefficient, and then the clustering coefficient of the each connected branch set is obtained according to clustering coefficients of multiple connected branches, thereby calculation accuracy of the clustering degree of the connected branch set is increased and further calculation accuracy of the centrality is increased.

Above embodiments describe a process of determining a center vertex. After the center vertex of the social network is determined, a process of dividing the social network is also included. In an embodiment, the process of dividing the social network includes two steps as described below. In a first step, in the social network, a sub-social set including a center vertex is determined. In a second step, the sub-social set is removed from the social network to obtain an updated social network. The process returns to an operation of determining the center vertex, i.e. any of the above embodiments and above first step and second step, until there is no vertex with the target attribute in the updated social network.

Removing a sub-social set from the social network includes removing each vertex in the sub-social set from the social network and also each connection relationship of the each vertex in the sub-social set.

After the updated social network is obtained, it is determined whether the updated social network includes a vertex with the target attribute. If so, the operation of determining the center vertex is executed, further the center vertex with the target attribute is determined from the updated social network, and then subsequent steps are performed. In this way, another sub-social set is obtained. If the updated social network does not include any vertex with the target attribute, it means that there is no more interested vertex in the updated social network and there is no need for further dividing the updated social network. In an embodiment, remaining vertices in the social network may form an external set. Since there is no vertex with the target attribute in the social network at this time, it may be considered that the remaining vertices in the social network are all vertices without the target attribute, and these remaining vertices without the target attribute form an external set.

In this embodiment, a first vertex with the target attribute in the social network is determined, and a sub-social set including the first vertex is determined, so that a partial social group including the first vertex is marked out from the social network, and an updated social network is obtained by removing the sub-social set from the social network; the process returns to the operation of determining the first vertex until there is no vertex with the target attribute in the social network. Multiple local social groups may be marked out from the social network, which is in conformity to the distribution characteristics of social groups in real life, and increases accuracy of social network division.

In an embodiment, through determination of at least one second vertex associated with the first vertex and having the target attribute, the at least one second vertex and the first vertex form a sub-social set, so that a local social group centered on the first vertex and having the target attribute is marked out. Since the local social group is centered on the first vertex, the second vertex is associated with the first vertex, and the first vertex and the second vertex both have the target attribute, the partial social group is more suitable to the social groups in real life, and a method for dividing a social network is more accurate.

In an embodiment, after the sub-social set including the center vertex is determined, the method further includes steps described below. A third vertex without the target attribute is determined among all vertices associated with any vertex in the sub-social set; at least one fourth vertex with the target attribute and not being in the sub-social set is determined among vertices associated with the third vertex; and a vertex satisfying a preset requirement is selected from the at least one fourth vertex and is divided into the sub-social set.

In this embodiment, after the sub-social set is formed, a vertex associated with the sub-social set, having the target attribute and being not in the sub-social set, is divided into the sub-social set to further expand the sub-social set, so the number of sub-social sets is reduced and the calculation amount is thus reduced; besides, the sub-social set is further optimized to be closer to the social groups in real life.

In this embodiment, since there may be multiple vertices in a sub-social set, in the social network without the sub-social set, a vertex associated with any vertex in the sub-social set is determined as a third vertex. In an embodiment, a vertex associated with any vertex in the sub-social set may be directly connected to the any vertex in the sub-social set. A vertex associated with a third vertex may be directly connected to the third vertex.

Figure 3B:
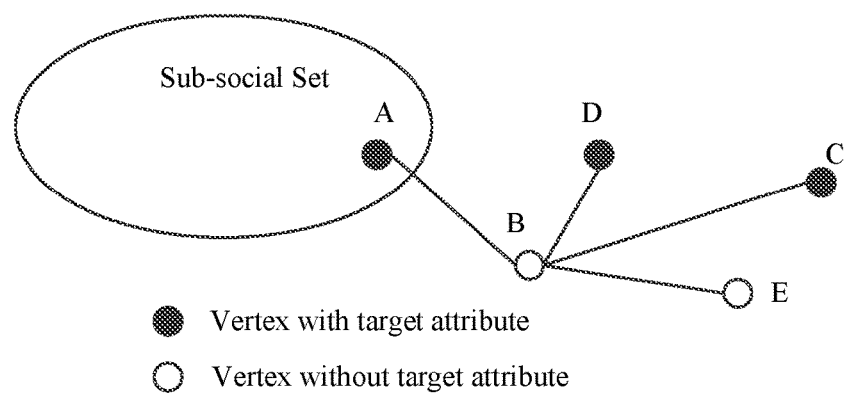
FIG. 3b is a structural diagram of a social network according to an embodiment.

In an example, as shown in FIG. 3b, a vertex A is in the sub-social set and is connected to a vertex B without the target attribute, the vertex B is connected to a vertex C with the target attribute, a vertex D with the target attribute and a vertex E without the target attribute. First, the vertex B without the target attribute is determined among the vertices directly connected to the vertex A. Vertices directly connected to vertex B include the vertex A, the vertex C, the vertex D and a vertex E. Among these vertices, the vertex C and the vertex D have the target attribute and are not in the sub-social set, and each of vertex C and vertex D is taken as a fourth vertex.

Researchers may autonomously set a preset requirement. For example, all fourth vertices may be divided into a sub-social set, or a randomly preset number of fourth vertices may be selected and be divided into the sub-social set.

In an embodiment, a target network formed by vertices with the target attribute in the social network is determined; path lengths between multiple fourth vertices and the first vertex in the target network are calculated; a vertex with a path length to the first vertex satisfying a length requirement is selected and divided into the sub-social set. In an embodiment, a connection relationship between vertices in the target network is as same as a connection relationship between corresponding vertices in the social network. In the target network, all vertices on a path from a fourth vertex to the first vertex have the target attribute. In this embodiment, edges between connected vertices have a same weight. Based on this, a path length between a fourth vertex and the first vertex refers to a number of edges included in a shortest path between the fourth vertex and the first vertex. In an embodiment, researchers may autonomously set a preset requirement. In an example, a fourth vertex with a path length to the first vertex less than or equal to a length threshold is divided into the sub-social set. In an embodiment, the length threshold is set to be 3, 4, 5, etc. In another example, a fourth vertex with a shortest path length to the first vertex is divided into the sub-social set.

In this way, a fourth vertex is separated from the sub-social set by a third vertex without the target attribute. However, the fourth vertex is associated with the sub-social set, and the third vertex is associated with the fourth vertex, so that the fourth vertex is closer to the sub-social set and may be divided into the sub-social set.

In this embodiment, a third vertex without the target attribute is determined among vertices associated with any vertex in the sub-social set, at least one fourth vertex with the target attribute and not being in the sub-social set is determined among vertices associated with the third vertex; a vertex satisfying the preset requirement is selected from the at least one fourth vertex to be divided into the sub-social set, thereby the sub-social set is further expanded, the number of sub-social sets is reduced and the calculation amount is further reduced; besides, the sub-social sets are further improved to be closer to the social groups in real life; through dividing a fourth vertex with a path length to the first vertex less than or equal to the length threshold into the sub-social set or dividing a fourth vertex with a shortest path length to the first vertex into the sub-social set, a distance between the fourth vertex divided into the sub-social set and the first vertex is guaranteed to be short enough, and the accuracy of sub-social set division is increased.

In an embodiment, before multiple first vertices with the target attribute are determined, the method further includes that isolated vertices and/or leaf vertices with the target attribute may be removed from the social network.

In an embodiment, it is determined whether there is an isolated vertex and/or leaf vertex with the target attribute in the social network, if there is an isolated vertex and/or leaf vertex with the target attribute in the social network, the isolated vertex and/or leaf vertex with the target attribute is removed from the social network. If there is no isolated vertex and/or leaf vertex with the target attribute in the social network, it is determined whether there is a vertex with the target attribute in the social network. If there is a vertex with the target attribute in the social network, a first vertex with the target attribute in the social network is determined; if there is no vertex with the target attribute in the social network, this operation is ended, or remaining vertices in the social network form an external set at the same time.

In an embodiment, an isolated vertex refers to a vertex with a degree of 0, and a leaf vertex refers to a vertex with a degree of 1. Because an isolated vertex is not connected with any vertex and a leaf vertex is connected to only one vertex, a connection relationship of these vertices is too simple. If an isolated vertex or a leaf vertex is selected as the first vertex, the sub-social set has only one vertex or two vertices, which is practically meaningless. Moreover, an error may occur when an agglomeration coefficient is calculated. Based on this, the isolated vertices and/or leaf vertices with the target attribute may be removed before the first vertex is determined.

In this embodiment, the removal of the isolated vertices and/or leaf vertices with the target attribute avoids the existence of only one vertex or two vertices in a sub-social set, guarantee sufficient vertices in the sub-social set, so that the sub-social set is practically meaningful.

On the basis of above embodiments, after division of the social network is completed, a user may change from a user without the target attribute to a user with the target attribute due to mutual influence and spread among users. For example, an original registered user A is converted into an authenticated user under promotion of authenticated user B. In order to promote this favorable transformation, this embodiment provides a preset element to a user beneficial to this favorable transformation for motivation.

In an embodiment, after there is no vertex with the target attribute in the updated social network, the method further includes steps described below. A fifth vertex converted from a vertex without the target attribute to a vertex with the target attribute is obtained; a sub-social set associated with the fifth vertex is obtained; and a preset element is provided to a user corresponding to each vertex in the sub-social set.

In an embodiment, an existing attribute of a vertex without the target attribute is reacquired at a preset time interval, such as one week, ten days or one month. If a vertex is converted from a state of not having the target attribute to a state of having the target attribute, this vertex is taken as a fifth vertex. Then, a sub-social set, where a vertex associated with the fifth vertex and having the target attribute is located, is obtained as a sub-social set associated with the fifth vertex. In an embodiment, a vertex associated with the fifth vertex is directly connected to the fifth vertex. In an embodiment, the preset element may be at least one of a gift, a service, money or the like.

In an embodiment, the provision of the preset element to a user corresponding to each vertex in the sub-social set includes: a first incentive coefficient corresponding to the first vertex and a second incentive coefficient corresponding to other vertices in the sub-social set are obtained; a preset element matching with the first excitation coefficient is provided to a user corresponding to the first vertex; a preset element matching with the second excitation coefficient is provided to users corresponding to other vertices in the sub-social set. In an embodiment, the first incentive coefficient is greater than the second incentive coefficient, and the preset element matching with the first incentive coefficient has a greater value than the preset element matching with the second incentive coefficient. Therefore, advertising effect of a user corresponding to the first vertex, relationship effect and network effect between other vertices and the external set are maximized according to a mode of decreasing a paid incentive from the first vertex to other vertices in the sub-social set.

Embodiment Four

Figure 4:
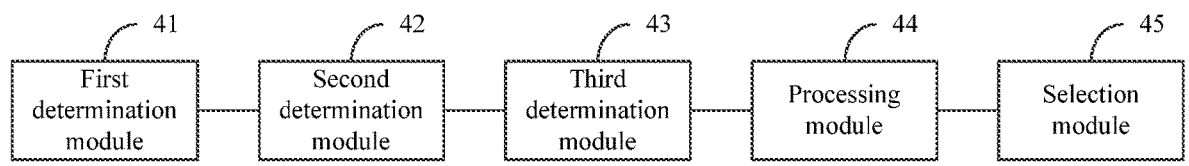
FIG. 4 is a structural diagram of an apparatus for determining a center vertex in a social network according to an embodiment.

FIG. 4 is a structural diagram of an apparatus for determining a center vertex in a social network according to an embodiment. As shown in FIG. 4, the apparatus according to this embodiment includes a first determination module 41, a second determination module 42, a third determination module 43, a processing module 44 and a selection module 45.

The first determination module 41 is configured to determine multiple first vertices with a target attribute in the social network. The second determination module 42 is configured to determine multiple sub-social sets. Each sub-social set includes one first vertex among the multiple first vertices. The third determination module 43 is configured to determine a connected branch set corresponding to the each sub-social set. The connected branch set corresponding to the each sub-social set is a set of connected branches in a graph formed by vertices associated with the each sub-social set and lacking the target attribute. The processing module 44 is configured to obtain centrality of the first vertex included in the each sub-social set according to the each sub-social set and the connected branch set corresponding to the each sub-social set. The selection module 45 is configured to select a first vertex with centrality satisfying a preset centrality requirement from the multiple first vertices as the center vertex.

In this embodiment, multiple first vertices with target attribute in the social network are determined, and multiple sub-social sets are determined, each sub-social set includes a corresponding first vertex and a connected branch set corresponding to the each sub-social set, and the connected branch set corresponding to each sub-social set is a set of connected branches in a graph formed by vertices associated with the each sub-social set and lacking the target attribute; the centrality of the first vertex contained in each sub-social set is obtained according to the each sub-social set and the connected branch set corresponding to the each sub-social set, so that the centrality of the each first vertex is obtained according to internal and external sets, and the first vertex with the centrality satisfying the preset centrality requirement is selected as the central vertex, so that influence of an internal set and an external set on centrality of the first vertex is fully taken into consideration, and mutual influence among vertices with different attributes is fully considered, so that determination of the central vertex is more accurate.

In an embodiment, the second determination module 42 is configured to: determine multiple second vertex sets, where each second vertex set corresponds to one first vertex among the multiple first vertices, each second vertex in the each second vertex set is associated with the first vertex corresponding to the each second vertex set and has the target attribute; and form a sub-social set by the each second vertex set and the first vertex corresponding to the each second vertex set.

In an embodiment, the selection module 45 is configured to: select a first vertex with maximum centrality from the multiple first vertices as the central vertex; or select a first vertex with centrality greater than or equal to a centrality threshold from the multiple first vertices as the central vertex.

In an embodiment, the processing module 44 is configured to: calculate a clustering degree of the each sub-social set; calculate a clustering degree of the connected branch set corresponding to the each sub-social set; and to obtain the centrality of the first vertex included in the each sub-social set according to the clustering degree of the each sub-social set and the clustering degree of the connected branch set corresponding to the each sub-social set.

In an embodiment, the processing module 44 is configured to calculate the clustering degree of the each sub-social set in a following manner: calculating a clustering coefficient of a sub-social set $M_j$ corresponding to a j-th first vertex, according to a vertex clustering coefficient formula:

$$f(M_j) = \frac{2}{\|M_j\| * (\|M_j\| - 1)} \sum_{i,j <= \|M_j\|, i \neq j}^{\|M_j\|} V_{ij};$$

where j represents an index of first vertex, i represents an index of second vertex, $\|M_j\|$ represents a number of vertices in a sub-social set $M_j$, $V_{ij}$ represents an edge between a j-th first vertex and an i-th second vertex in the sub-social set $M_j$, and $\Sigma_{i,j<=\|M_j\|,i\neq j}^{\|M_j\|} V_{ij}$ represents a sum of numbers of edges between the j-th first vertex and $\|M_j\|-1$ second vertices in the sub-social set $M_j$.

In an embodiment, the processing module 44 is configured to calculate the clustering degree of the each sub-social set in a following manner: calculating a clustering coefficient of a k-th connected branch in a connected branch set $C_j$ corresponding to a j-th first vertex, according to a vertex clustering coefficient formula:

$$f(\text{clique}_{j,k}) = \frac{2}{\|\text{clique}_{j,k}\| * (\|\text{clique}_{j,k}\| - 1)} \sum_{p,q=1, p \neq q}^{\|\text{clique}_{j,k}\|} V_{pq};$$

and obtaining a clustering coefficient of the connected branch set $C_j$ corresponding to the j-th first vertex, according to a clustering coefficient of at least one connected branch in the connected branch set $C_j$ corresponding to the j-th first vertex.

The j represents an index of first vertex, $\text{clique}_{j,k}$ represents the k-th connected branch in the connected branch set corresponding to the j-th first vertex, $\|\text{clique}_{j,k}\|$ represents a number of vertices in a connected branch $\text{clique}_{j,k}$, $V_{pq}$ represents an edge between a p-th vertex and a q-th vertex in the connected branch $\text{clique}_{j,k}$, and $\Sigma_{p,q=1, p\neq q}^{\|\text{clique}_{j,k}\|} V_{pq}$ represents a sum of numbers of edges among multiple vertices in the connected branch $\text{clique}_{j,k}$.

In an embodiment, the processing module 44 is configured to obtain the clustering coefficient of the connected branch set $C_j$ corresponding to the j-th first vertex, according to the clustering coefficient of the at least one connected branch in the connected branch set $C_j$ corresponding to the j-th first vertex in a following manner: calculating weighted average of the clustering coefficient of the at least one connected branch in the connected branch set $C_j$ corresponding to the j-th first vertex using $$\sum_{k=1}^{\|C_j\|} \frac{\|\text{clique}_{j,k}\|}{\|C_j\|} * f(\text{clique}_{j,k})$$

to obtain the clustering coefficient of the connected branch set $C_j$ corresponding to the j-th first vertex; where $\|C_j\|$ represents a number of connected branches in the connected branch set $C_j$.

The apparatus for determining the center vertex in the social network according to this embodiment may execute the method for determining the center vertex in the social network according to any embodiment, and has corresponding functional modules and beneficial effects for executing the method.

Embodiment Five

Figure 5:
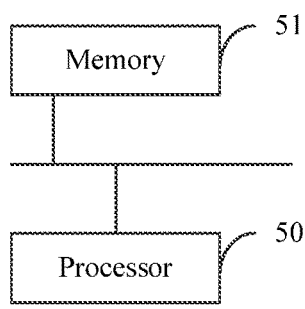
FIG. 5 is a structural diagram of an electronic device according to an embodiment.

FIG. 5 is a schematic structural diagram of an electronic device according to embodiment 5. As shown in FIG. 5, the electronic device includes a processor 50 and a memory 51. The electronic device may have at least one processor 50. In an example where the electronic device includes one processor 50 as shown in in FIG. 5, the processor 50 and the memory 51 in the electronic device may be connected through a bus or in other manners. In the example as shown in FIG. 5, the connection is implemented through a bus.

As a computer readable storage medium, the memory 51 may be used to store software programs, computer executable programs and modules, such as program instructions or modules (e.g., the first determination module 41, the second determination module 42, the third determination module 43, the processing module 44 and the selection module 45 in the apparatus for determining the center vertex in the social network) corresponding to the method for determining the center vertex in the social network in the above embodiments. The processor 50 executes the software programs, instructions and modules stored in the memory 51 to implement at least one functional application and data processing of the electronic device, i.e. the above-mentioned method for determining the center vertex in the social network.

The memory 51 may mainly include a program storage area and a data storage area. The storage program area may store an operating system and an application program required for at least one function; the storage data area may store data created according to use of a terminal and others. In addition, the memory 51 may include a high-speed random access memory and further include a non-volatile memory, such as, at least one disk memory device, flash memory device, or other non-volatile solid-state memory devices. In some embodiments, the memory 51 may include a memory disposed relative remotely to the processor 50, which may be connected to the electronic device through a network. Embodiments of the above network include, but not limited to, the Internet, an intranet, a local area network, a mobile communication network, and combinations thereof.

Embodiment Six

This embodiment further provides a computer readable storage medium for storing a computer program. When executed by a processor, the computer program implements the method for determining a center vertex in a social network. The method includes steps described below. Multiple first vertices with a target attribute in the social network are determined; multiple sub-social sets are determined, where each sub-social set comprises one first vertex among the multiple first vertices; a connected branch set corresponding to the each sub-social set is determined, where the connected branch set corresponding to the each sub-social set is a set of connected branches in a graph formed by vertices associated with the each sub-social set and lacking the target attribute; centrality of the first vertex included in the each sub-social set is obtained according to the each sub-social set and the connected branch set corresponding to the each sub-social set; and a first vertex with centrality satisfying a preset centrality requirement from the multiple first vertices is selected as the center vertex.

This embodiment provides a computer readable storage medium on which the computer program is stored. The computer program is not limited to operations of above-mentioned method, but may also perform related operations in the method for determining a center vertex in a social network according to any of the above embodiments.

From above description of the embodiments, those skilled in the art may realize that the present disclosure may be implemented by means of software and necessary general-purpose hardware, of course, it may also be implemented by means of hardware, but in many cases the former is a better embodiment. Based on this understanding, the present disclosure may be embodied in the form of a software product, which may be stored in a computer readable storage medium, such as a floppy disk, read-only memory (ROM), random access memory (RAM), flash memory, hard disk or an optical disk of a computer, including at least one instruction to cause a computer device (which may be a personal computer, a server or a network device, and etc.) to perform the method according to any of the above embodiments.

At least one unit and module included in the embodiment of the device for determining the center vertex in the social network are divided only according to a functional logic, but not limited to the above division, as long as a corresponding function may be realized; in addition, a name of each functional unit is only for convenience of distinguishing from each other and is not used to limit the protection scope of the present disclosure.

The above are only the embodiments and applied technical principles of the present disclosure.

What is claimed is:

1. A method for determining a center user in a social network, wherein the social network refers to a relationship network formed among a plurality of users based on social activities through a plurality of electronic devices of the plurality of users; when a computer is used to process the social network, the social network is regarded as a structure of a graph, each user in the social network is defined as a vertex in the graph, and a relationship between two users in the social network is defined as an edge between two vertices corresponding to the two users; the relationship between two users refers to one of the two users is stored in an address book of the other, there is a call between the two users, or there is business contact between the two users, the method comprising:

determining, by the computer, a plurality of first users with an authenticated user attribute from the plurality of users in the social network;

determining, by the computer, a plurality of sub-social sets based on the plurality of first users with the authenticated user attribute, wherein each sub-social set comprises one first user among the plurality of first users and at least one second user associated with the one first user and having the authenticated user attribute;

determining, by the computer, a connected branch set corresponding to the each sub-social set, wherein the connected branch set corresponding to the each sub-social set is a set of connected branches in the graph formed by users associated with each user in the each sub-social set and lacking the authenticated user attribute;

obtaining, by the computer, centrality of the one first user comprised in the each sub-social set according to the each sub-social set and the connected branch set corresponding to the each sub-social set; and selecting, by the computer, from the plurality of first users, a first user with maximum centrality or a first user with centrality greater than or equal to a centrality threshold as the center user.

2. The method of claim 1, wherein determining, by the computer, the plurality of sub-social sets based on the plurality of first users with the authenticated user attribute comprises:

determining, by the computer, a plurality of second user sets, wherein each second user set corresponds to one first user among the plurality of first users, each second user in the each second user set is associated with the one first user corresponding to the each second user set and has the authenticated user attribute; and forming, by the computer, a sub-social set by the each second user set and the one first user corresponding to the each second user set.

3. The method according to claim 1, wherein obtaining, by the computer, the centrality of the one first user comprised in the each sub-social set, according to the each sub-social set and the connected branch set corresponding to the each sub-social set comprises:

calculating, by the computer, a clustering degree of the each sub-social set;

calculating, by the computer, a clustering degree of the connected branch set corresponding to the each sub-social set; and obtaining, by the computer, the centrality of the one first user comprised in the each sub-social set according to the clustering degree of the each sub-social set and the clustering degree of the connected branch set corresponding to the each sub-social set.

4. The method of claim 3, wherein calculating, by the computer, the clustering degree of the each sub-social set comprises:

calculating, by the computer, a clustering coefficient of a sub-social set $M_j$ corresponding to a j-th first user, according to a user clustering coefficient calculating, by the computer, a clustering coefficient of a sub-social set $M_j$ corresponding to a j-th first user, according to a user clustering coefficient formula:

$$f(M_j) = \frac{2}{\|M_j\| * (\|M_j\| - 1)} \sum_{i,j<=\|M_j\|, i \neq j}^{\|M_j\|} V_{ij};$$

wherein j represents an index of first user, i represents an index of second user, $\|M_j\|$ represents a number of users in a sub-social set $M_j$, $V_{ij}$ represents an edge between a j-th first user and an i-th second user in the sub-social set $M_j$, and $\Sigma_{i,j<=\|M_j\|, i \neq j}^{\|M_j\|} V_{ij}$ represents a sum of numbers of edges between the j-th first user and $\|M_j\|-1$ second users in the sub-social set $M_j$.

5. The method of claim 3, wherein calculating, by the computer, the clustering degree of the connected branch set corresponding to the each sub-social set comprises:

calculating, by the computer, a clustering coefficient of a k-th connected branch in a connected branch set $C_j$ corresponding to a j-th first user, according to a user clustering coefficient formula:

$$f(\text{clique}_{j,k}) = \frac{2}{\|\text{clique}_{j,k}\| * (\|\text{clique}_{j,k}\| - 1)} \sum_{p,q=1, p \neq q}^{\|\text{clique}_{j,k}\|} V_{pq};$$

and obtaining, by the computer, a clustering coefficient of the connected branch set $C_j$ corresponding to the j-th first user, according to a clustering coefficient of at least one connected branch in the connected branch set $C_j$ corresponding to the j-th first user;

wherein j represents an index of first user, $\text{clique}_{j,k}$ represents the k-th connected branch in the connected branch set corresponding to the j-th first user, $\|\text{clique}_{j,k}\|$ represents a number of users in a connected branch $\text{clique}_{j,k}$, $V_{pq}$, represents an edge between a p-th user and a q-th user in the connected branch $\text{clique}_{j,k}$, and $\Sigma_{p,q=1, p \neq q}^{\|\text{clique}_{j,k}\|} V_{pq}$ represents a sum of numbers of edges among a plurality of users in the connected branch $\text{clique}_{j,k}$.

6. The method of claim 5, wherein obtaining, by the computer, the clustering coefficient of the connected branch set $C_j$ corresponding to the j-th first user, according to the clustering coefficient of the at least one connected branch in the connected branch set $C_j$ corresponding to the j-th first user comprises:

performing, by the computer, weighted average of the clustering coefficient of the at least one connected branch in the connected branch set $C_j$ corresponding to the j-th first user using $$\sum_{k=1}^{\|C_j\|} \frac{\|\text{clique}_{j,k}\|}{\|C_j\|} * f(\text{clique}_{j,k})$$

to obtain the clustering coefficient of the connected branch set $C_j$ corresponding to the j-th first user;

wherein $\|C_j\|$ represents a number of connected branches in the connected branch set $C_j$.

7. An apparatus for determining a center user in a social network, wherein the social network refers to a relationship network formed among a plurality of users based on social activities through a plurality of electronic devices of the plurality of users; when the apparatus is used to process the social network, the social network is regarded as a structure of a graph, each user in the social network is defined as a vertex in the graph, and a relationship between two users in the social network is defined as an edge between two vertices corresponding to the two users; the relationship between two users refers to one of the two users is stored in an address book of the other, there is a call between the two users, or there is business contact between the two users, the apparatus comprising:

at least one processor; and a memory, which is configured to store at least one program, wherein the at least one program, when executed by the at least one processor, implements following operations:

determining a plurality of first users with a target an authenticated user attribute from the plurality of users in the social network;

determining a plurality of sub-social sets based on the plurality of first users with the authenticated user attribute, wherein each sub-social set comprises one first user among the plurality of first users and at least one second user associated with the one first user and having the authenticated user attribute;

determining a connected branch set corresponding to the each sub-social set, wherein the connected branch set corresponding to the each sub-social set is a set of connected branches in the graph formed by users associated with each user in the each sub-social set and lacking the authenticated user attribute;

obtaining centrality of the one first user comprised in the each sub-social set according to the each sub-social set and the connected branch set corresponding to the each sub-social set; and selecting, from the plurality of first users, a first user with maximum centrality or a first user with centrality greater than or equal to a centrality threshold as the center user.

8. A non-transitory computer readable storage medium, storing a computer program, wherein the computer program, when executed by a processor, implements the method for determining a center user in a social network according to claim 1.

9. The method according to claim 2, wherein obtaining, by the computer, the centrality of the one first user comprised in the each sub-social set, according to the each sub-social set and the connected branch set corresponding to the each sub-social set comprises:
   calculating, by the computer, a clustering degree of the each sub-social set;
   calculating, by the computer, a clustering degree of the connected branch set corresponding to the each sub-social set; and
   obtaining, by the computer, the centrality of the one first user comprised in the each sub-social set according to the clustering degree of the each sub-social set and the clustering degree of the connected branch set corresponding to the each sub-social set.

10. The method of claim 4, wherein calculating, by the computer, the clustering degree of the connected branch set corresponding to the each sub-social set comprises:
   calculating, by the computer, a clustering coefficient of a k-th connected branch in a connected branch set $C_j$ corresponding to a j-th first user, according to a user clustering coefficient formula:

$$f(\text{clique}_{j,k}) = \frac{2}{\|\text{clique}_{j,k}\| * (\|\text{clique}_{j,k}\| - 1)} \sum_{p,q=1, p \neq q}^{\|\text{clique}_{j,k}\|} V_{pq};$$

and
   obtaining, by the computer, a clustering coefficient of the connected branch set $C_j$ corresponding to the j-th first user, according to a clustering coefficient of at least one connected branch in the connected branch set c, corresponding to the j-th first user;
   wherein j represents an index of first user, $\text{clique}_{j,k}$ represents the k-th connected branch in the connected branch set corresponding to the j-th first user, $\|\text{clique}_{j,k}\|$ represents a number of users in a connected branch $\text{clique}_{j,k}$, $V_{pq}$ represents an edge between a p-th user and a q-th user in the connected branch $\text{clique}_{j,k}$, and $\Sigma_{p,q=1,p\neq q}^{\|\text{clique}_{j,k}\|} V_{pq}$ represents a sum of numbers of edges among a plurality of users in the connected branch $\text{clique}_{j,k}$.

* * * * *